US005760886A

United States Patent [19]

Miyazaki et al.

[11] Patent Number: 5,760,886

[45] Date of Patent: Jun. 2, 1998

[54] SCANNING-TYPE DISTANCE MEASUREMENT DEVICE RESPONSIVE TO SELECTED SIGNALS

[76] Inventors: Hidenori Miyazaki; Yoshiro Tasaka; Takashi Shouji, all of 10,Tsuchido-cho Hanazono, Ukyo-ku, Kyoto 616, Japan

[21] Appl. No.: 509,690

[22] Filed: Jul. 31, 1995

[30] Foreign Application Priority Data

Jul. 29, 1994 [JP] Japan .................................... 6-196217

[51] Int. Cl.$^6$ .............................. G01C 3/08; B60T 7/16; G01B 11/26

[52] U.S. Cl. ........................ 356/5.01; 180/169; 356/141.1

[58] Field of Search .................................... 356/375, 376, 356/4.01, 3.01, 141.1, 5.01, 5.1; 180/169

[56] References Cited

U.S. PATENT DOCUMENTS 4,355,895 10/1982 Cairns et al. ........................ 356/141.1

4,764,982 8/1988 Pfund .................................. 356/141.1

*Primary Examiner*—Stephen C. Buczinski

*Attorney, Agent, or Firm*—Foley & Lardner

[57] ABSTRACT

A scanning-type distance measurement device is responsive to selected signals to reduce interference due to stray light. An emitted beam of light is aimed to be reflected from an object and to a photodetector among a plurality of photodetectors which are positioned linearly or in two-dimensions. The outputs of the photodetectors are selected based on the position of the emitted beam of light, so that photodetectors which should not contribute to the reflected beam, based on the geometry of the emitted beam and the reflecting object, are ignored. This approach reduces the effects of stray noise from other light sources. The selection of the photodetectors is synchronized with a scanning light emitter generating the beam of light by a position signal and an angular signal so that the noise component in the output signal which is due to stray light can be kept to a minimum.

29 Claims, 18 Drawing Sheets

15
ANGLE DETECTION
SCANNING ANGLE
26
PSD
23
22
LED
25
10
COMMAND
ROTATION OF MIRROR
21
EMISSION OF BEAM
24
12
11
DRIVE
PULSE GENERATOR
COMMAND
CPU
TIMING AND LIGHT EMISSION
27
28
29
13
14
P D
SWITCHES
AMP
TIMING
MEASURED TIME INTERVAL
HEAD
20
CONTROL OF SWITCHES

CPU
10
SCANNING ANGLE
COMMAND
COMMAND
TIMING AND LIGHT EMISSION
MEASURED TIME INTERVAL
CONTROL OF SWITCHES
ANGLE DETECTION
15
PULSE GENERATOR
11
12
DRIVE
TIMING
14
AMP
13
20
HEAD
ROTATION OF MIRROR
24
LED
25
PSD
26
22
EMISSION OF BEAM
21
23
SWITCHES
29
P D
28
27

START
ROTATE MIRROR COMMAND AND EMIT BEAM COMMAND ARE OUTPUT
51
HORIZONTAL SCANNING ANGLE IS RECEIVED
52
DETERMINATION IS MADE AS TO WHICH OF REGIONS A THROUGH K THE BEAM WILL STRIKE
53
A
B
C
J
K
ELEMENTS NO. 10, 11 GO ON
54A
ELEMENTS NO. 9,10,11 GO ON
54B
ELEMENTS NO. 8, 9, 10 GO ON
54C
ELEMENTS NO. 1, 2, 3 GO ON
54J
ELEMENTS NO. 1, 2 GO ON
54K

START
EMIT BEAM COMMAND IS OUTPUT
50
COMMAND SPECIFYING SCANNING ANGLE IS OUTPUT
51A
HORIZONTAL SCANNING ANGLE IS RECEIVED
52
DETERMINATION IS MADE AS TO WHICH OF REGIONS A THROUGH K THE BEAM WILL STRIKE
53
A
B
C
J
K
54A
ELEMENTS NO. 10, 11 GO ON
54B
ELEMENTS NO. 9, 10, 11 GO ON
54C
ELEMENTS NO. 8, 9, 10 GO ON
54J
ELEMENTS NO. 1, 2, 3 GO ON
54K
ELEMENTS NO. 1, 2 GO ON

CPU
10A
HORIZONTAL SCANNING ANGLE
VERTICAL SCANNING ANGLE
COMMAND
COMMAND
TIMING AND LIGHT EMISSION
MEASURED TIME INTERVAL
CONTROL OF SWITCHES
15
ANGLE DETECTION
15A
ANGLE DETECTION
PULSE GENERATOR
11
12
DRIVE
TIMING
14
AMP
13
20
HEAD
ROTATION OF MIRROR
24A
LED
25
LED
25A
PSD
26A
PSD
26
22
EMISSION OF BEAM
21
SWITCHES
29A
P D
28A
23
27

13
AMP
29A
28A
15
14
13
12
11
10
9
8
7
6
5
4
3
2
No. 1

START
EMIT BEAM COMMAND IS OUTPUT
60
COMMANDS SPECIFYING HORIZONTAL AND VERTICAL SCANNING ANGLES ARE OUTPUT
61A
HORIZONTAL AND VERTICAL SCANNING ANGLES ARE PICKED UP
62
DETERMINATION IS MADE AS TO WHICH OF REGIONS A THROUGH O THE BEAM WILL STRIKE
63
A
B
H
N
O
64A
ELEMENTS NO. 10,14,15 GO ON
64B
ELEMENTS NO. 9,13,14, 15 GO ON
64H
ELEMENTS NO. 3,7,8,9, 13 GO ON
64N
ELEMENTS NO. 1,2,3,7 GO ON
64O
ELEMENTS NO. 1,2,7 GO ON

SCANNING-TYPE DISTANCE MEASUREMENT DEVICE RESPONSIVE TO SELECTED SIGNALS

FIELD OF THE INVENTION

This invention concerns a scanning-type distance measurement device responsive to selected signals which reduces interference due to stray light, a vehicle equipped with such a scanning-type distance measurement device, and an optical device to detect light responsive to selected signals.

BACKGROUND OF THE INVENTION

A scanning-type distance measurement device according to this invention, when installed on a first vehicle, can detect the distance between that first vehicle and another vehicle preceding or following that first vehicle. This method, which is also known as scanning-type laser radar, entails projecting a pulse-type laser beam at fixed intervals while scanning the beam over a specified angular range. The beam, reflected by the other vehicle is detected. Typically the other vehicle is equipped with reflectors having recurrent reflective characteristics. By measuring the time interval between the time when the beam is projected and the time when the reflected beam is detected, the distance between the first vehicle and the other vehicle preceding or following the first vehicle can be determined.

With a scanning-type distance measurement device, it is desirable that the laser beam be scanned over a wide angle in order to yield a wide detection area. A wide scanning angle, however, requires a photodetector device with a large receptive surface. A drawback of a large receptive surface is a greater likelihood of receiving noise due to, for example, lights of vehicles in neighboring lanes. If such noise is received, the signal to noise S/N ratio of the device will suffer.

SUMMARY OF THE INVENTION

An object of this invention is to provide a scanning-type distance measurement device whose S/N ratio would be improved by suppressing, as much as possible, noise due to stray light.

A further objective of this invention is to improve the S/N ratio in a more generalized optical device to detect a scanned beam of light.

A device according to the invention measures the distance between one vehicle and another by projecting a pulsing beam of light at fixed time intervals while scanning the beam over a previously determined angular range. The light reflected by the other vehicle is detected, and the time between the moment the beam is projected and the moment the reflected beam is detected is measured to determine the distance between the vehicles. This device in a first embodiment includes a number of photodetectors arranged in the same plane in which the projected beam is scanned. The device according to the invention also includes a switch which selects the output signal from the photodetector corresponding to the angle at which the beam is being scanned, the selected photodetector detecting the reflection of the beam being scanned. The time measurement operation needed to measure the distance is completed in response to the signal selected by the aforesaid switch.

Generally speaking, the maximum distance which can be measured is predetermined. A beam of light is projected intermittently in the form of a pulse at intervals greater than the time required for the reflected beam to traverse this maximum distance. This allows the projected and reflected beams to be associated. For each direction in which the beam is projected, the direction in which its reflection will strike a photodetector can be predicted by geometrical optics. For each projected beam, one or more photodetector elements can be configured at the angle of incidence of the reflected beam based on the scanning angle of the projected beam. The signal from these photodetector elements is selectively received and used as the endpoint of the timing operation which began the moment the original beam was projected. By using the projected beam and only its corresponding reflected beam, the distance between two vehicles can be determined.

To measure the distance, only the signal from the photodetector element(s) which detect the reflected beam are selected. This insures that the measurement is not affected by stray light which strikes the other photodetector elements. In particular, since this method minimizes the probability that a signal from the photodetector will represent light emitted by a vehicle in a neighboring lane, the method according to the invention effectively prevents interference caused by laser radar devices associated with other cars. As is mentioned earlier, preferably each vehicle is equipped with reflectors which have recurrent reflective characteristics. This substantially reduces the quantity of light reflected by vehicles travelling in the neighboring lanes and so minimizes the probability of interference due to stray reflected light. A device according to this invention further reduces the probability of interference. Further, the method according to the invention provides particular advantages when the photodetector device has a large receptive surface.

When a photodetector device with a large surface is used, the following problems can occur. The larger the receptive surface, the greater the capacitance between terminals of the photodetector, and the more gentle the slope of a signal corresponding to detected light. The angle of the signal's rise also varies with the quantity of reflected light which strikes the detector, so a small quantity of light will result in a small rise angle. The quantity of reflected light which strikes the detector will vary with the distance between vehicles. When the angle of the signal's rise varies in the photodetector device, the endpoint of the timing operation will vary because the time at which signal crosses a given threshold level used to discriminate when to stop the timing varies. As a result, deviations will occur in measuring the distance .

With a device according to the invention, a large number of photodetector elements cover a wide receptive area. The receptive area of each detector element is small, and the rise of its signal is normally steep. Deviation due to measurement error resulting from deviation in the quantity of incident light can therefore be kept to a minimum.

A second embodiment according to the invention provides a scanning-type distance measurement device which can scan a projected beam of light in two dimensions.

This scanning-type distance measurement device in the second embodiment according to the invention is equipped with an optical device which projects a pulsing beam of light at fixed time intervals while scanning the beam over a previously determined two-dimensional angular range; a sensor device to detect the scanning angle of the projected beam; a sensor device to detect the scanning position of the projected beam; a photodetector device, which includes a number of photodetectors in a two-dimensional arrangement, and which detects the projected light beam once it is reflected by a vehicle; a selective switch which selects the output signal from one or more photodetectors in the location corresponding to the scanning angle detected by the aforesaid photodetector device and which detects the reflection of the beam projected at that angle of scanning; and a control device which calculates the distance of the aforesaid vehicle by measuring the interval between the time when the beam is projected by the aforesaid projection device and the time when the signal representing the corresponding reflected beam, which is selected by the aforesaid selective switch, is detected.

According to the invention, the projected beam is scanned over a previously determined two-dimensional angular range and position. For each direction in which the beam is projected, the direction in which its reflection will strike an array of photodetectors can be predicted by geometrical optics. For each projected beam, one or more photodetector elements can be configured to detect the beam which will be reflected, and the angle of incidence will be determined by the scanning direction of the projected beam. The distance between the vehicles can be determined by measuring the interval between the time when the beam is projected and the time when the signal from the photodetector which detects its reflection is received.

When a wide angular range is being scanned in two dimensions, it is more crucial that the photodetector elements have a large total surface area than it would be if only one dimension (for example, the horizontal) is being scanned. However, interference due to stray light is far more likely to occur with a two-dimensional scan. With a device according to the invention, the required area is covered by an array of photodetector elements with small receptive surfaces which are arranged in two dimensions. Because only the signal from the elements which detect the reflection of the projected beam is picked up, the measurement is much less likely to be affected by stray light.

A large area is thus covered by a large number of photodetector elements, each of which has a small surface area. As a result, the rise of the signal is normally steep, and variation due to measurement error resulting from deviation in the quantity of incident light can be kept to a minimum.

This invention also provides a more generalized optical device to detect a scanned beam of light.

BRIEF DESCRIPTION OF THE DRAWINGS

FIG. 9(A) is the waveform when a small photodiode is used; FIG. 9(B) is the waveform when a larger photodiode is used.

DESCRIPTION OF THE PREFERRED EMBODIMENT

A detailed explanation of an embodiment according to the invention which measures the distance between two vehicles (i.e., a "laser radar" device) is described herein with reference to the Figures.

Figure 1:
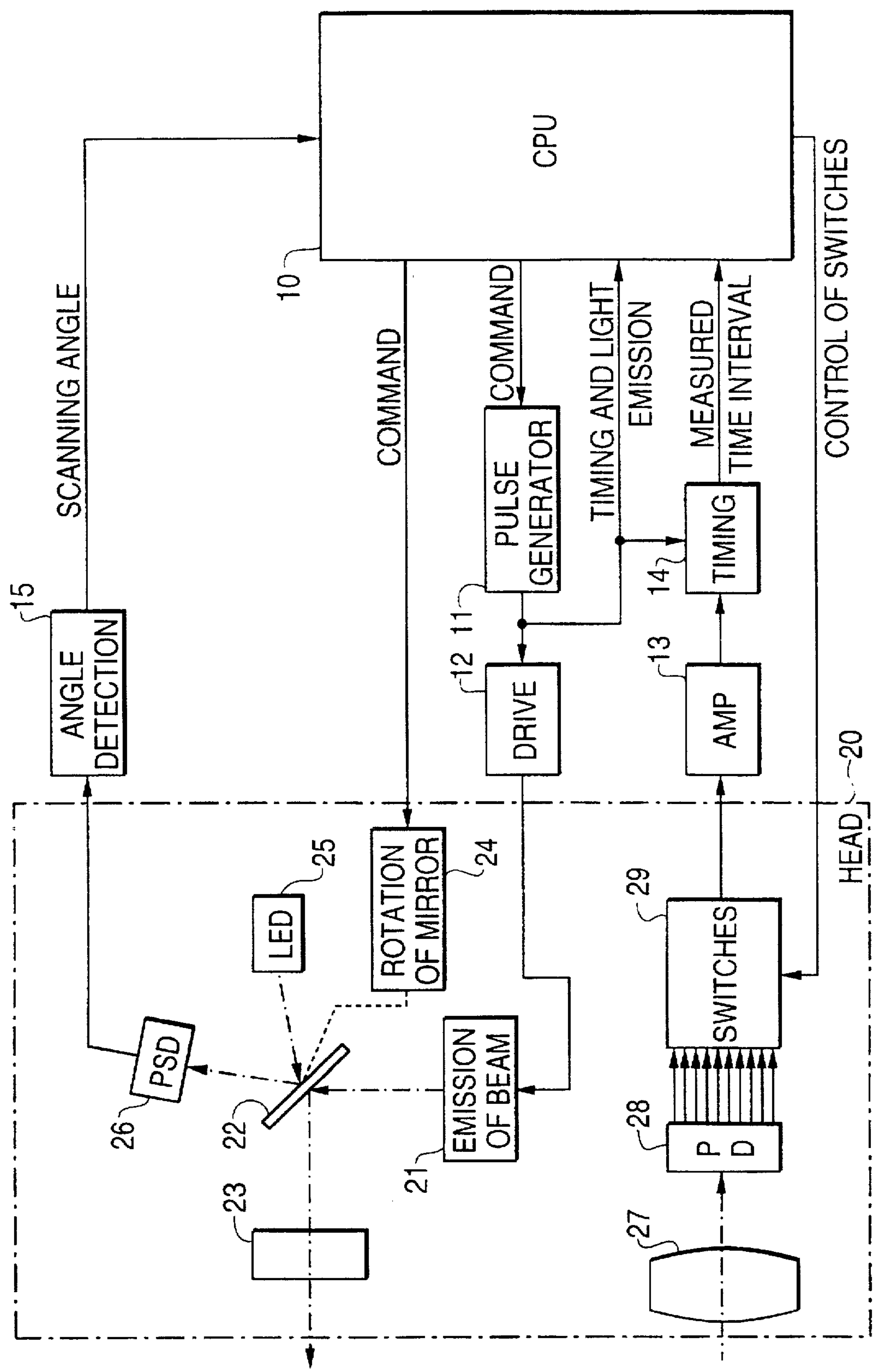
FIG. 1 is a block diagram of a scanning-type device to measure distance which scans in one dimension.

FIG. 1 shows an example of a configuration of a scanning-type device installed on an automobile to measure the distance between two vehicles.

Figure 2:
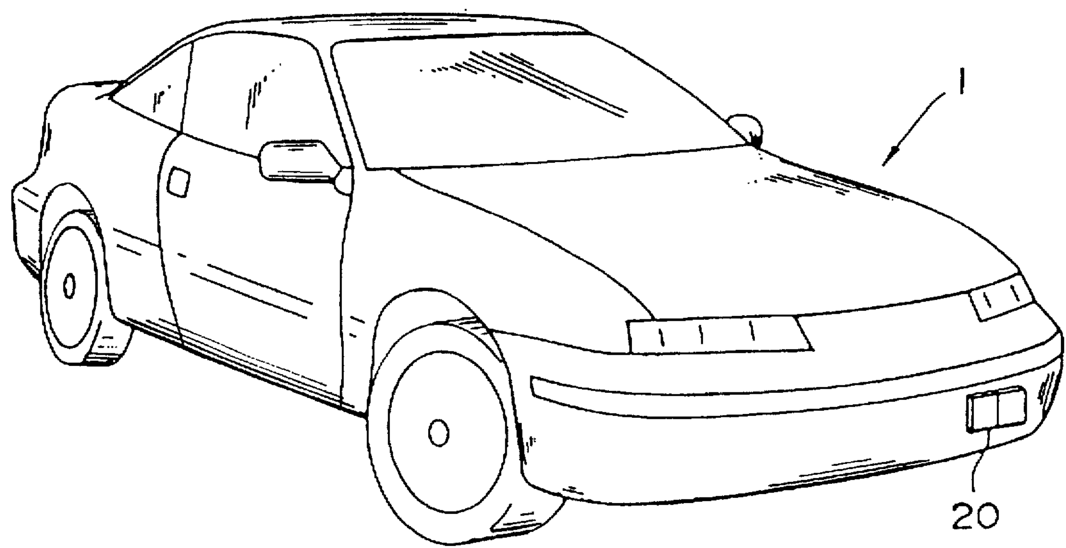
FIG. 2 is a perspective drawing of an automobile on which is installed a scanning-type device to measure distance.

Head 20 is mounted to either the front or the rear of the vehicle so that it can project a beam of light forward or backward. Head 20 contains both a subsection which projects a beam of light and one which detects the reflected beam. When it is to project a beam of light in front of the vehicle, head 20 is mounted somewhere on the front of the car, such as on or near the front bumper, as shown in FIG. 2. The entirety of head 20 need not be exposed on the exterior of vehicle 1, as long as openings are provided through which the laser beam can be projected and the reflected beam can be detected. Various signal processing circuits can thus be placed inside the vehicle.

The overall operation of the device to measure the distance between vehicles is controlled by CPU 10. CPU 10 generates commands to emit light and rotate a mirror, and it controls the operation of selective switch 29. CPU 10 also receives signals representing the angle of scanning, the timing of light emission and the times needed for measurement.

When CPU 10 transmits an emit light command to pulse generator circuit 11, circuit 11 begins generating a series of pulses with a fixed period. The period of the pulses is longer than the time required for the light to travel to and return from its target at the maximum distance which can be measured. These pulses are transmitted to drive circuit 12 and back to CPU 10.

CPU 10, in turn, transmits a rotate mirror command to rotation control device 24. In response to this command, rotation control device 24 rotates mirror 22, which will scan the light beam, back and forth over a fixed angular range (e.g., 200 mrad) in a plane such as the horizontal plane. Mirror 22 is rotated at a speed which allows a number of light pulses (e.g., 10 or 20) to be projected as the mirror is rotated over its full angular range.

Beam projection device 21 contains a laser diode and a collimating lens. In response to the emit signal, the laser diode of beam projection device 21 is driven in pulse fashion by drive circuit 12. Device 21 projects a collimated laser beam whose longitudinal cross section has a wide vertical dimension (e.g., 15 mrad). This laser beam is reflected by mirror 22 and passes through projection lens (cylindrical lens) 23. The angular range of scanning (i.e., the detection area) is, for example, on the order of 200 mrad in the horizontal plane. The longitudinal cross section of the beam is spread by projection lens 23 so that it has a vertical dimension of 50 mrad.

When mirror 22 is rotated, the beam is scanned over a specified angular range (the detection area).

The angle at which mirror 22 is oriented is detected by a combination of light emitting diode (LED) 25, which projects a beam toward mirror 22; scanning position sensing device (PSD) 26, which detects the position of the beam reflected by mirror 22; and angle detector circuit 15, which converts the position signal from the scanning position sensing device 26 into a signal representing the horizontal angle of scanning. This signal is then transmitted to CPU 10.

Figure 3:
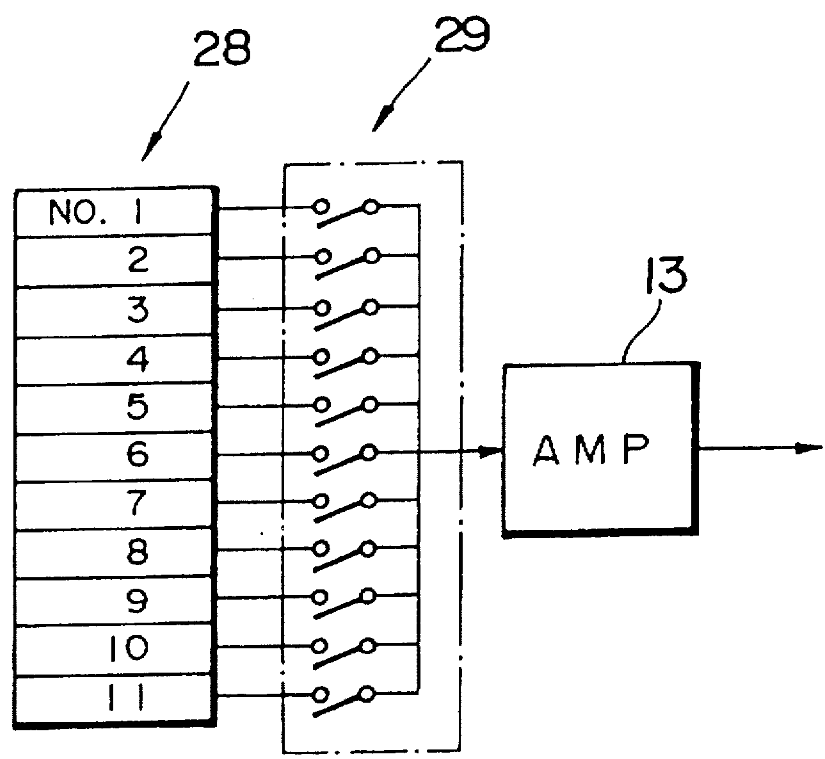
FIG. 3 is a circuit diagram illustrating an example of a configuration of photodetectors and switches which support scanning of the beam in one dimension.

The beam emitted by beam projection device 21 and reflected by mirror 22 is reflected by a reflector mounted on a preceding (or following) vehicle and strikes lens 27, where it is condensed on its way to photodetector device 28. This device, which is illustrated in FIG. 3, includes numerous (in this case, eleven) photodiodes (hereafter to be abbreviated as "PDs") arranged side by side in a horizontal array. The receptive surface of photodetector device 28 is made oblong so as to insure that the detection area described above (200 mrad×50 mrad) can be achieved. This surface is divided laterally (in the horizontal dimension; along the scanning path) into multiple PDs. The surfaces of all the PDs side by side constitute one long receptive surface.

The output signal from each PD in photodetector device 28 goes through selective switch 29, which is controlled by CPU 10 as will be discussed later. The selected output is transmitted to amplifier 13, where it is amplified, and a signal of a given threshold level is discriminated and input to timing circuit 14 as a stop timing signal. Selective switch 29 selectively outputs the signal or signals from one or more PDs. It contains a number of semiconductor switching elements, connected in parallel, which are equal in number to the number of PDs.

Figure 4:
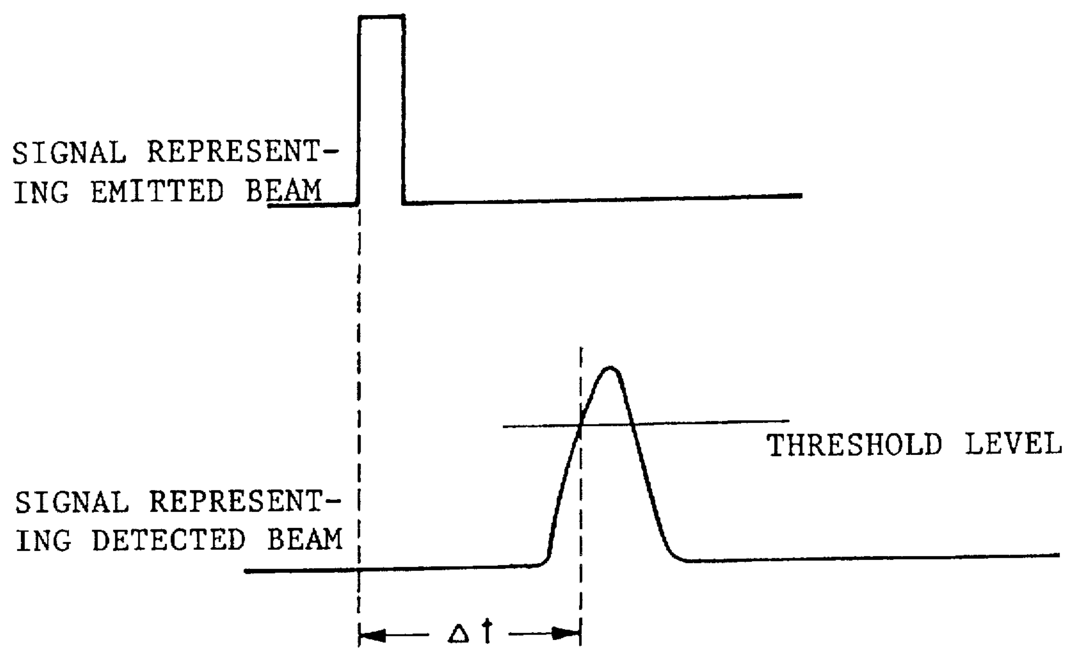
FIG. 4 shows waveforms of signals representing an emitted beam and a reflected beam.

Timing circuit 14 includes a timer or a counter. As can be seen in FIG. 4, timing circuit 14 begins its timing operation in response to an emit signal generated by pulse generator circuit 11. When the signal from photodetector device 28, which has been transmitted to selective switch 29 and amplifier 13, reaches a given threshold level, circuit 14 stops its timing operation in response to a stop timing signal output by amplifier 13. Time Δt, the interval between the time when the beam is projected and the time when the reflected beam is detected to be at the threshold level, is measured. A signal representing the measured interval Δt is transmitted to CPU 10. Based on the time Δt required for the beam to travel back and forth between the two cars, CPU 10 calculates the distance between the cars.

Figure 5:
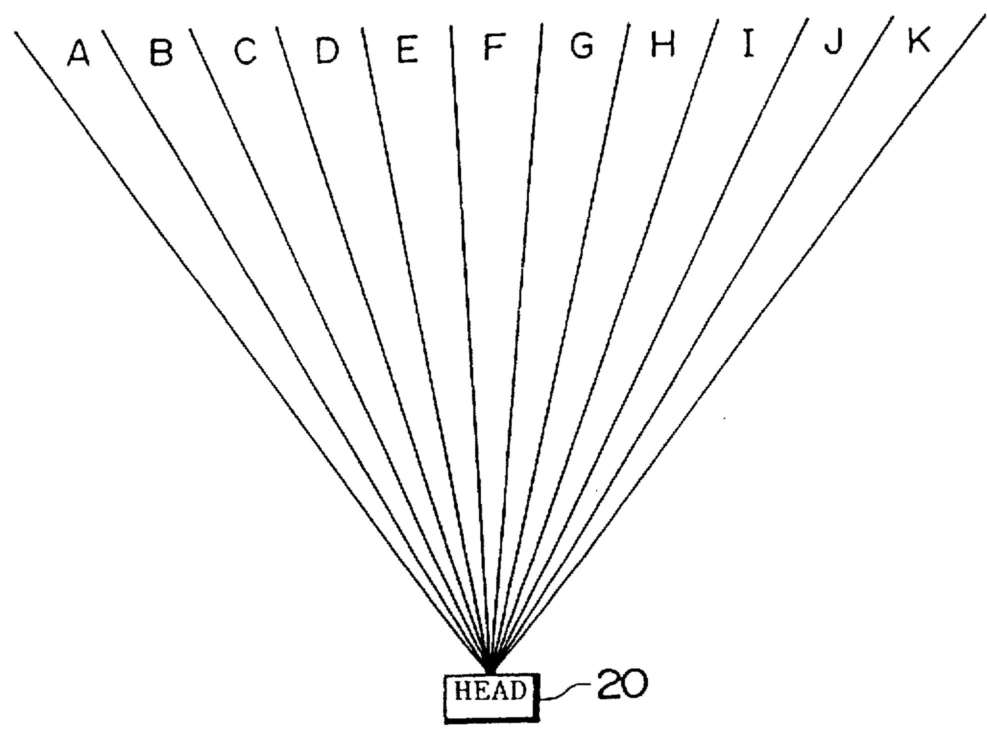
FIG. 5 shows an example of how the detection area is divided into small regions for one dimensional scanning.
Figure 6:
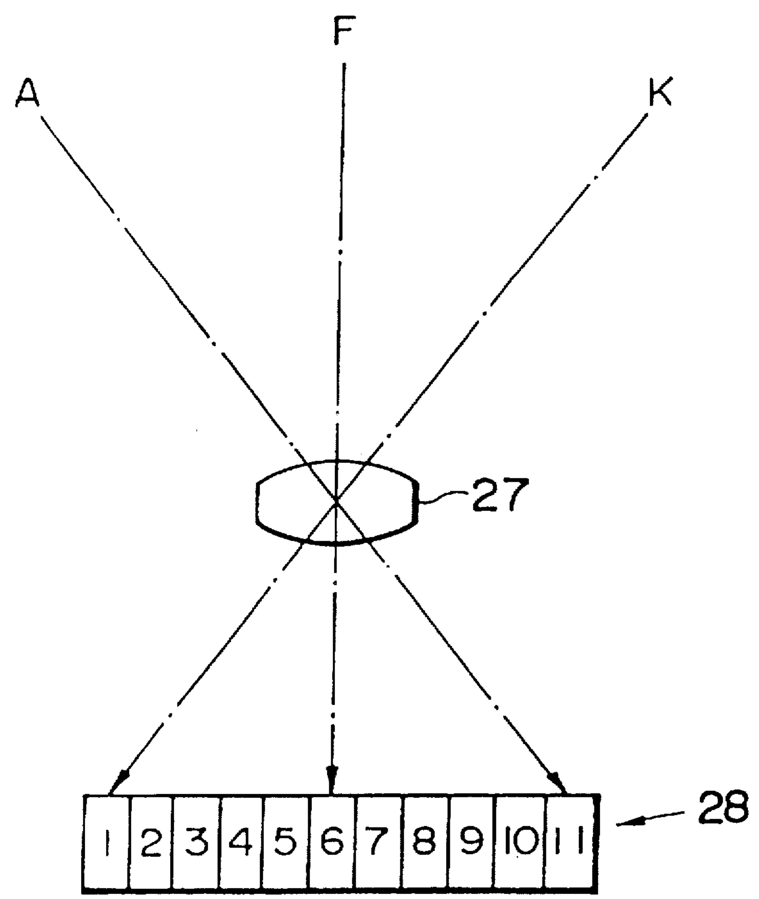
FIG. 6 shows an exemplary relationship between the optical system and the photodiodes in the configuration in which the beam is scanned in one dimension.

As can be seen in FIG. 5, the angular range over which the beam is scanned (the detection area) is divided into a number of small regions (in this example, eleven regions, A through K) which is equal to the number of PDs in photodetector device 28, so that each of regions A through K corresponds to a single PD. The reflection of the beam in one of these small regions passes through the receptive optical system which contains lens 27 and, as shown in FIG. 6, according to the laws of geometrical optics, should strike one and only one of the PDs. In principle, then, when a single beam is projected, a single semiconductor switching element in switch 29 should go on, causing the output signal from a single PD, which is determined by the horizontal angle at which the beam is scanned, to be transmitted to amplifier 13.

If the maximum distance which can be measured is 100 meters, the object (i.e., the other vehicle) must be somewhere in the range between 0 and 100 meters away. Lens 27 has some degree of aberration. Therefore, the reflected beam cannot be condensed so as to strike one and only one of the PDs. For this reason, switch 29 in this embodiment is controlled so as to select the output signals from the PD which is optically determined by the horizontal angle of the projected beam and to select also the signals from the PDs on either side of the optically determined PD. How many PD signals to select should be determined after considering the properties of the optical system.

Figure 7:
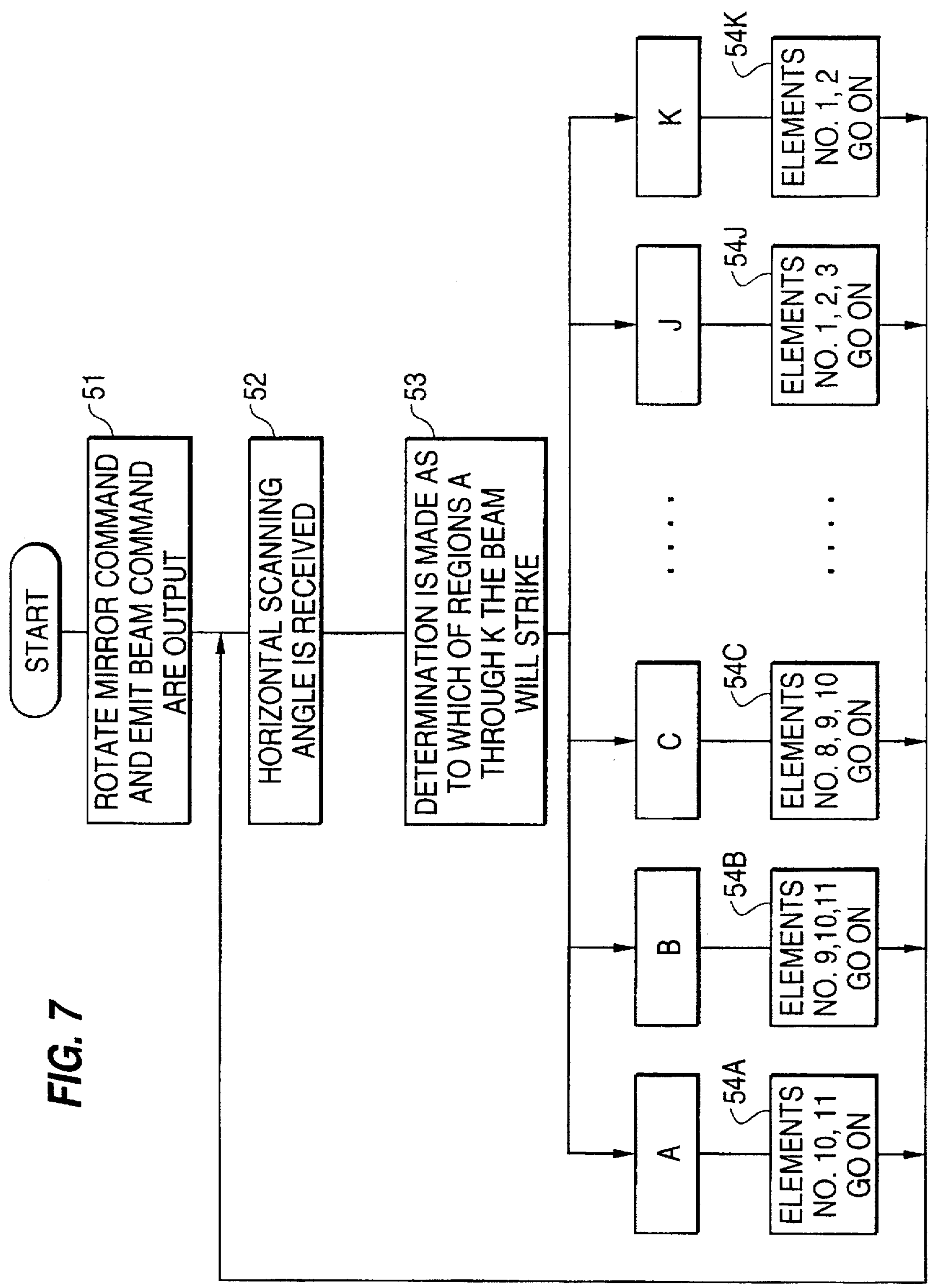
FIG. 7 is a flowchart of the order of processing executed to control the switches in the configuration in which the beam is scanned in one dimension.

FIG. 7 shows the order of processing performed by CPU 10 to control selective switch 29. For convenience, the PDs and the semiconductor switching elements in selective switch 29 connected to the PDs have been assigned element numbers 1 through 11 (See FIGS. 3 and 6).

First, when the rotate mirror command is transmitted to rotation device 24 and the emit command is transmitted to pulse generator circuit 11 the scanning of the beam begins (Step 51).

A signal representing the horizontal angle of scanning is received (Step 52), and based on this angle, it is determined which of regions A through K will be struck by the beam (Step 53). The semiconductor switching element which corresponds to that region turns on (Steps 54A through 54K). Switching elements for adjacent regions may also be turned on as previously mentioned. For example, if it is determined that the beam will strike region A, semiconductor switching elements 10 and 11 go on (Step 54A), and the signals from PDs 10 and 11 are added and input to amplifier 13. If the beam is to strike region B, switching elements 9, 10 and 11 go on (Step 54B). The operations shown in FIG. 7 should be synchronized with reference to a timing signal for light emission which is input into CPU 10.

In this way the PD(s) corresponding to the path of the beam are selected, and the distance is calculated using the signal from those PDs. Although stray light (including light emitted or reflected by vehicles in neighboring lanes) may strike the PDs which are not selected, the distance measurement operation will not be affected by this light.

There is a further advantage to constructing the photodetector device from a number of PDs each having a small receptive surface.

Figure 8A:
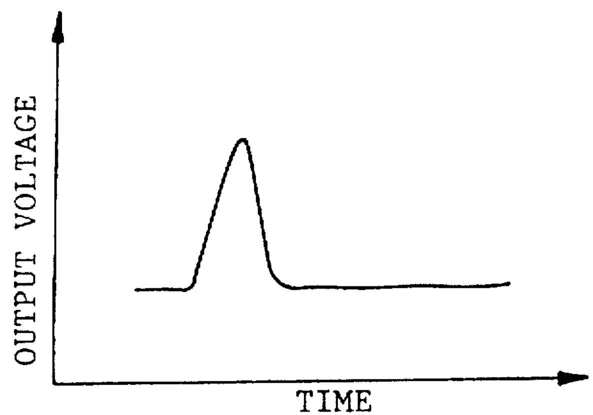
FIG. 8(A) shows the waveform of the signal representing detection of the beam when a small photodiode is used.
Figure 8B:
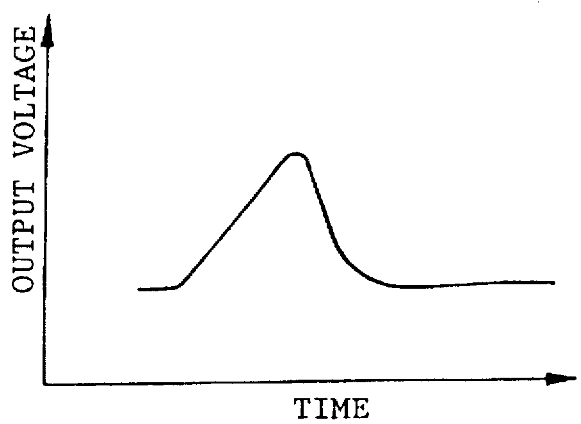
FIG. 8(B) shows the waveform of the signal representing detection of the beam when a larger photodiode is used.

FIGS. 8(A) and 8(B) show the difference in the waveform of the signal for photodiodes with different sizes of receptive surfaces. FIG. 8(A) shows a small photodiode, which has a steep rise because the capacitance between terminals is small. FIG. 8(B) shows, by way of comparison, a large photodiode with a gradual rise.

Figure 9A:
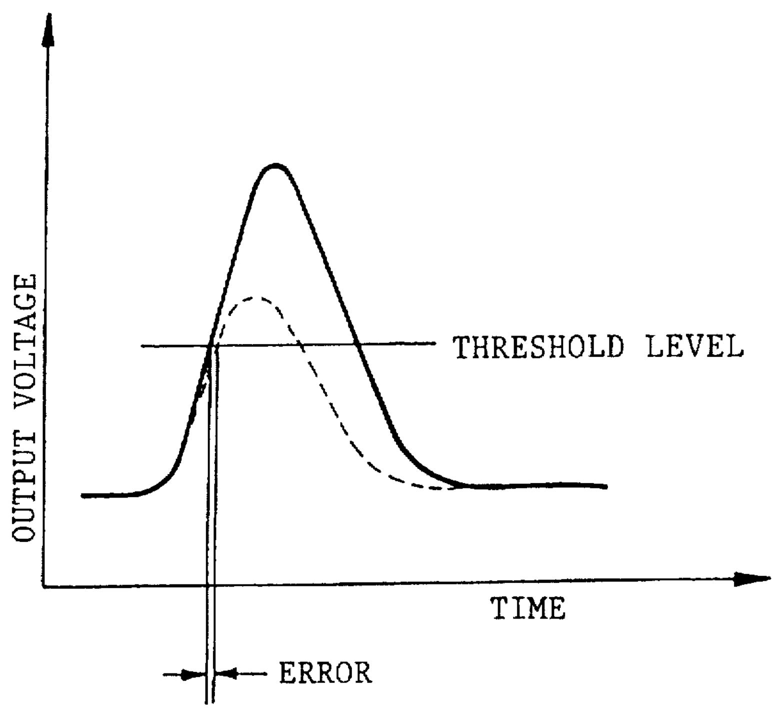
FIGS. 9(A) and 9(B) show how the waveform of the signal differs with the quantity of light striking the diode.
Figure 9B:
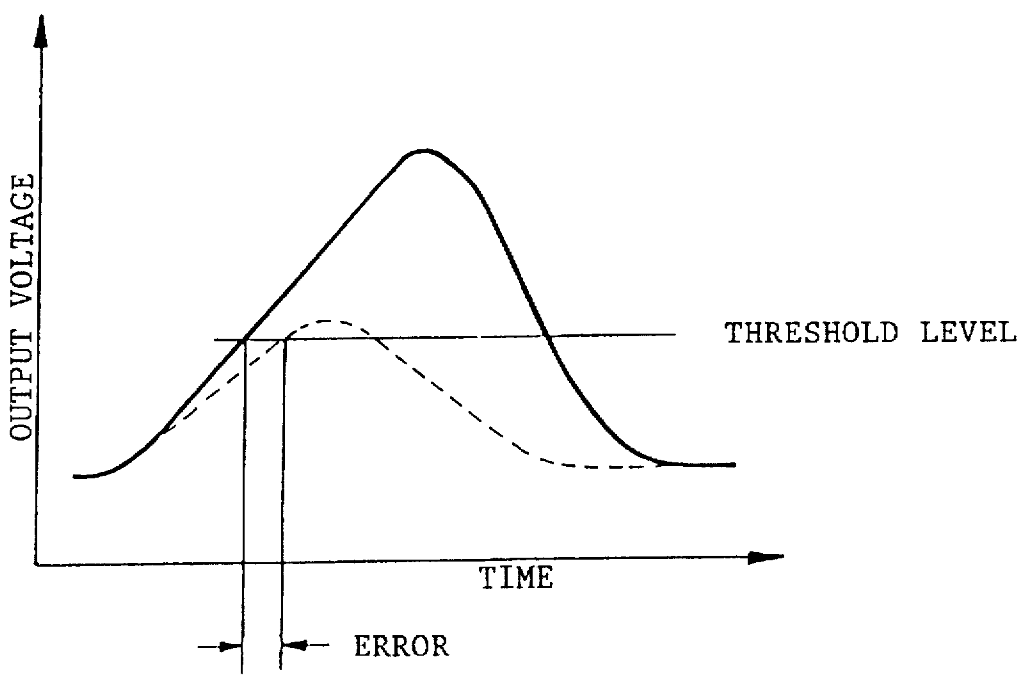

FIG. 9(A) and 9(B) show how the waveform of the signal differs with the quantity of light striking the diode. The solid line represents a large quantity of light, the broken line a smaller quantity. FIG. 9(A) shows the waveform of a small photodiode and FIG. 9(B) shows that of a large photodiode.

When the object (i.e., the vehicle) is closer (when the distance is shorter), the quantity of light reflected will be larger; when the object is further away, the quantity will be smaller.

When a large photodiode is used, as can be seen in FIG. 9(B), there will be a considerable discrepancy between the times required for the signal to reach the threshold level at longer and shorter distances (i.e., with a larger or smaller quantity of light). This will result in large variances in distance detection (because the signal will cause the timing operation in timer circuit 14 to stop).

In contrast, a small photodiode will produce a signal which reaches a threshold level at almost the same time regardless of the quantity of light reflected, as shown in FIG. 9(A). This will result in only a small variance in distance detection.

Thus if a large number of photodiodes with small surface areas are arrayed to form a photodetector instead of using a single photodiode with a large surface, the error in distance detection can be kept small.

If the two PDs next to the one struck by the reflected beam are also selected, the signals from all three PDs will be added. This will produce a signal whose level is virtually the same as that of a signal from a single PD. Thus, even though the reflected beam is detected by two PDs, the error in distance detection will remain small.

Figure 10:
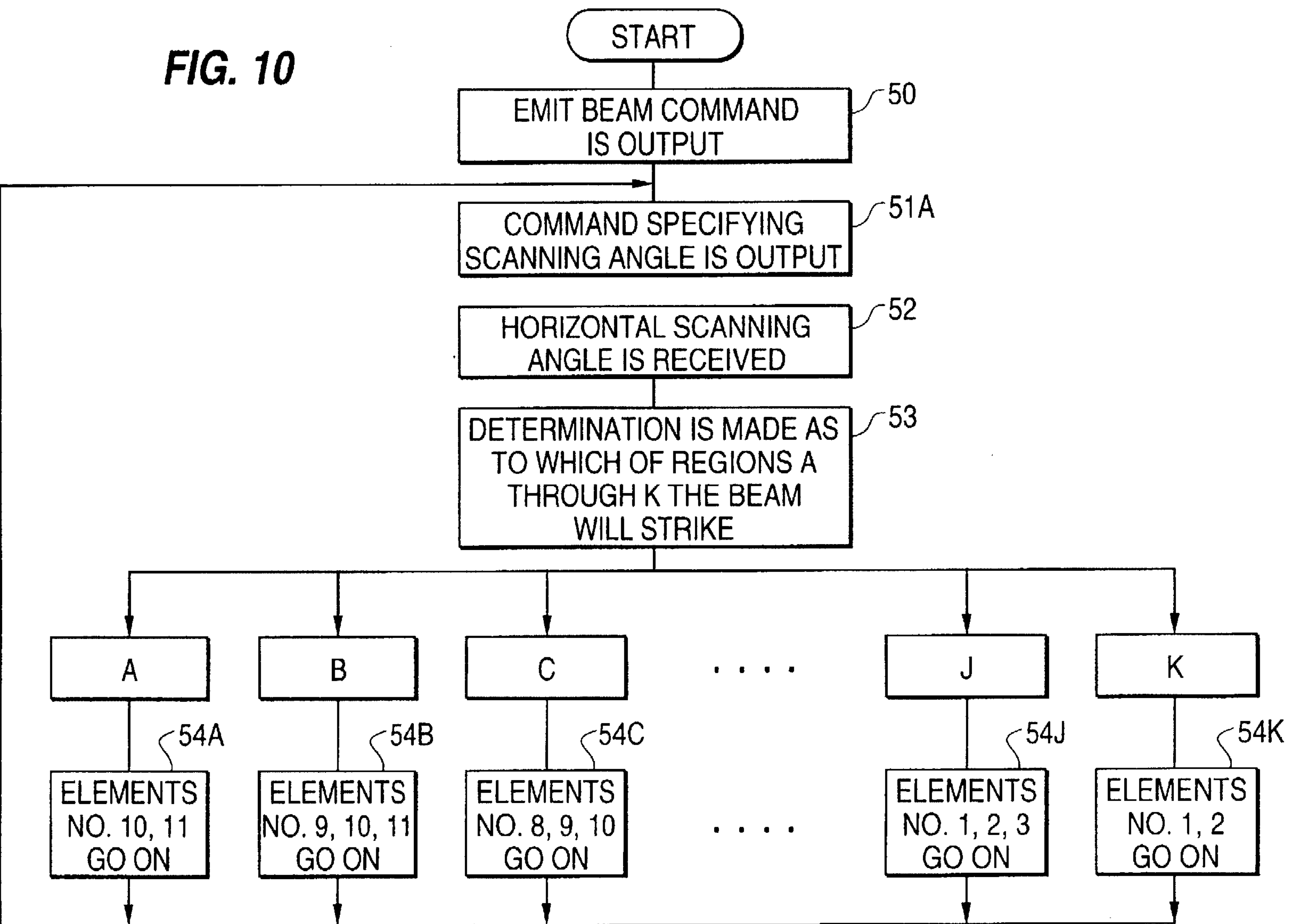
FIG. 10 is a flowchart of the order of processing executed to control the switches when the beam is scanned in a specified direction.

FIG. 10 shows the order of processing executed to control selective switch 29 when the beam is projected along a path (a horizontal scanning angle) specified by CPU 10. Operations in FIG. 10 which are identical to operations in FIG. 7 are given the same numbers, and an explanation of them is therefore omitted.

First, CPU 10 transmits an emit command to pulse generator circuit 11, and projection device 21 projects a beam of light (Step 50).

CPU 10 transmits a command specifying the horizontal scanning angle (a rotate mirror command) to rotation device 21 (Step 51A). The horizontal scanning angle may be specified as a certain number of degrees, or it may be specified randomly or chaotically.

In response to a timing signal from pulse generator circuit 11, the signal representing the horizontal scanning angle is picked up by angle detector circuit 15 (Step 52). Based on this scanning angle, it is determined which of regions A through K the beam will strike (Step 53). The semiconductor switching element(s) corresponding to that region go on (Steps 54A to 54K). The remainder of the process is as previously described herein.

Figure 11:
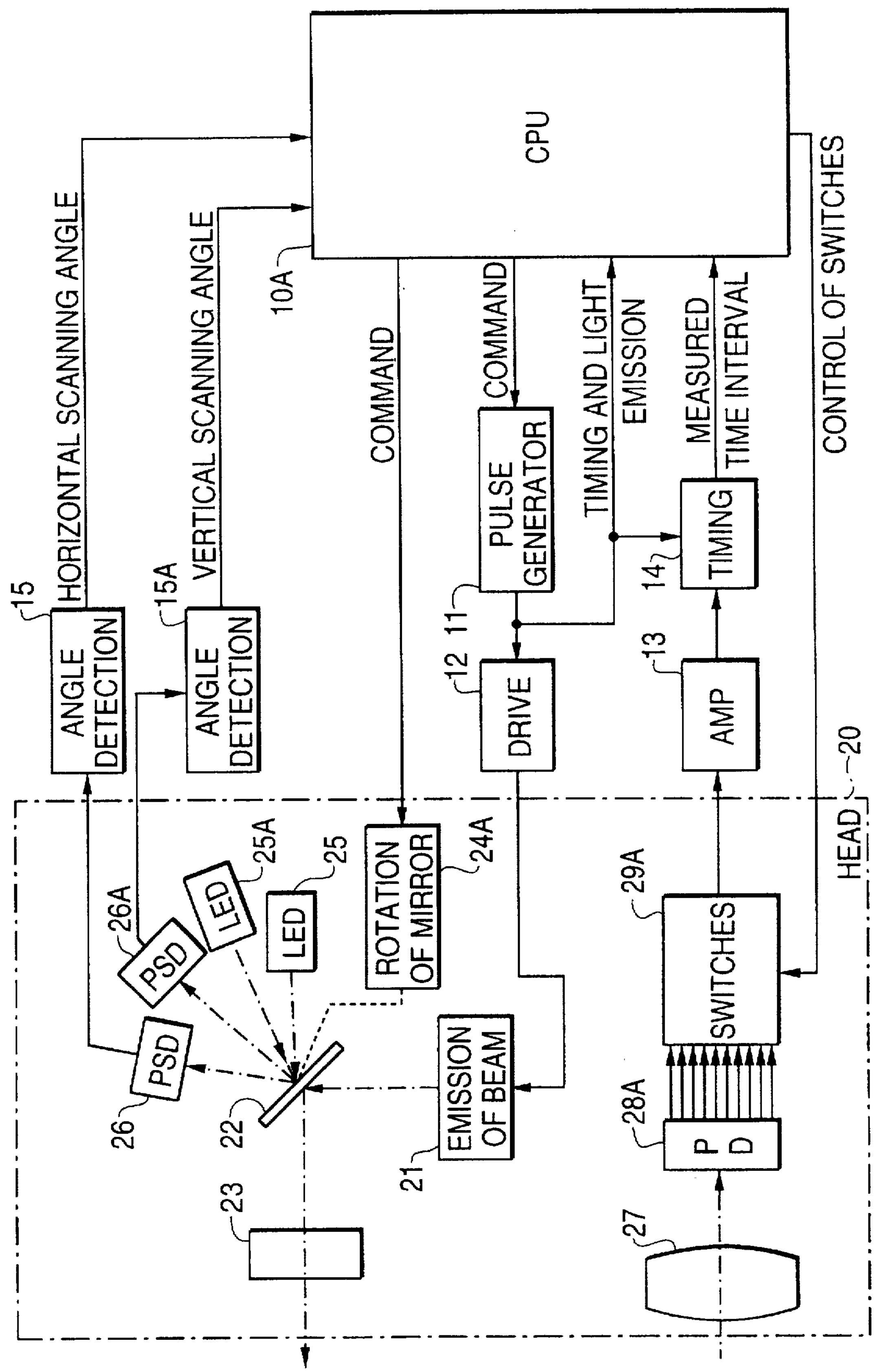
FIG. 11 is a block diagram of a scanning-type device according to the invention which scans in two dimensions.

FIG. 11 shows another example of a configuration of a scanning-type device installed on an automobile to measure the distance between vehicles which is. Components in FIG. 11 which are identical to components in FIG. 1 are given the same numbers, and an explanation of them is therefore omitted.

The overall operation of the device to measure the distance between vehicles is controlled by CPU 10A. CPU 10A generates the emit light and rotate mirror commands and controls switch 29A. CPU 10A also receives signals representing the horizontal and vertical scanning angles, timing signals for light emission and signals representing the times used to measure the distance.

CPU 10A also transmits the rotate mirror command to rotation device 24A. In response to this command, device 24A rotates mirror 22, which is used to scan the beam, back and forth over a specified angular range in the horizontal plane. At either end of the aforesaid angular range, device 24A rotates the mirror over a specified angle in the vertical plane. Mirror 22 is rotated at a speed which allows a number of light beams (e.g., 10 or 20) to be projected as the mirror is rotated over its full angular range.

Figure 12:
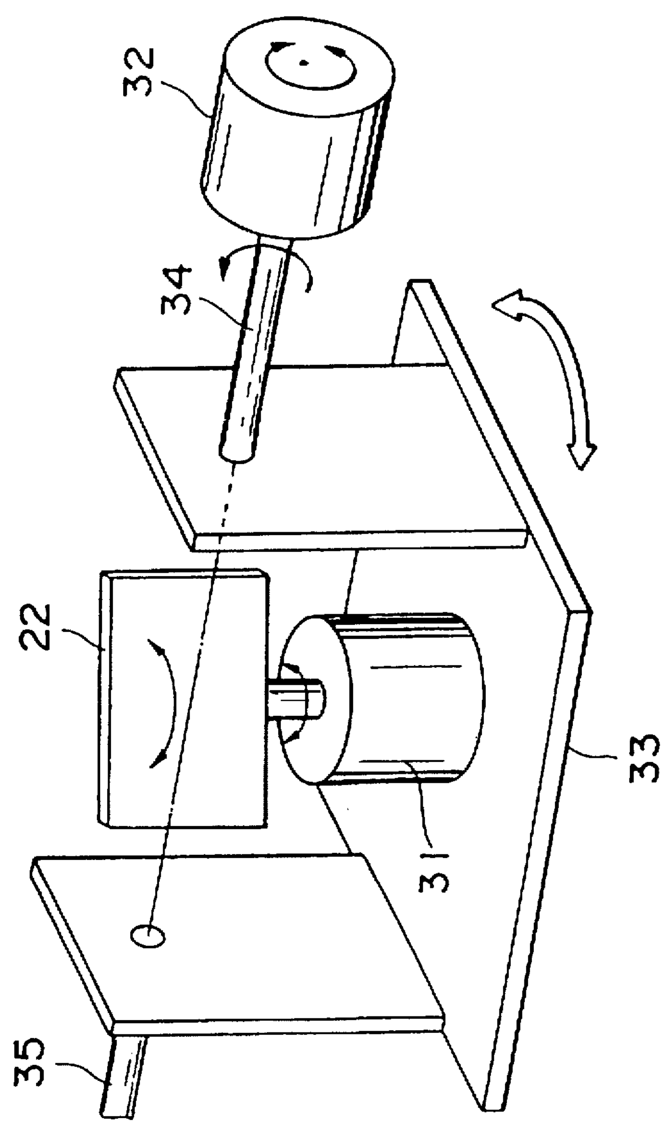
FIG. 12 shows the mirror and a portion of the device which rotates the mirror of the device of FIG. 11.

FIG. 12 shows mirror 22 and a portion of rotation device 24A.

Mirror 22 is mounted to the rotating shaft of motor 31, which is used for horizontal scanning. Motor 31 is mounted on stage 33. Rotating shaft 34 is mounted to the rotating shaft of motor 32, which is used for vertical scanning. Another rotating shaft, 35, is supported by a bearing (not pictured). Motor 32 is supported by the frame (not pictured) of head 20.

Motor 31, the one used for horizontal scanning, is driven by a drive circuit (not pictured) which is contained in mirror rotation device 24A. Mirror 22 is rotated in a horizontal direction. Motor 32, the one used for vertical scanning, is driven by a separate drive circuit (not pictured). By rotating stage 33 (along with mirror 22 and motor 31), the motor causes mirror 22 to rotate in a vertical direction.

In the embodiment of FIG. 1, a collimated laser beam from projection device 21 is reflected by mirror 22 and its longitude is altered by lens 23. Since in that embodiment the beam is scanned in only the horizontal direction, an exemplary beam of 50 mrad in the vertical dimension is selected to cover an area of 200 mrad×50 mrad. Thus, the laser beam projected by device 21, which has a vertical dimension of 15 mrad, is spread to 50 mrad by lens 23.

In the embodiment shown in FIGS. 11 and 12, the beam is also scanned in the vertical direction in addition to the horizontal direction. For this reason, it is necessary to use a laser beam with a wide vertical dimension. The laser beam projected by device 21 should be reflected by mirror 22. In this second embodiment, then, lens 23 is not always needed. A lens 23 may be provided as needed to increase the width of the vertical dimension of the beam.

When mirror 22 is rotated in both the horizontal and vertical directions, the beam is scanned over a given angular range (the detection area) in two dimensions.

The horizontal scanning angle of mirror 22 is detected by light emitting diode 25, scanning position sensing device 26 and angle detector circuit 15.

The angle of mirror 22 in the vertical direction (the vertical scanning angle) is detected by a combination of light emitting diode 25A, which projects a beam at mirror 22; scanning position sensing device 26A, which detects the position of the beam reflected by mirror 22; and angle detector circuit 15A, which converts the position signal from scanning position sensing device 26A into a signal representing scanning angle.

The horizontal and vertical scanning angles may also be detected as follows. A light emitting diode and a slit array are mounted on the rotation site along with mirror 22. Through the slit, a scanning position sensing device detects the position of the beam emitted by the diode. The position signal from the detector element is converted to a signal representing the scanning angle by the angle detector circuit. A separate light emitting diode, slit array, scanning position sensing device and angle detector circuit must be provided to detect the horizontal and the vertical angles.

Figure 13:
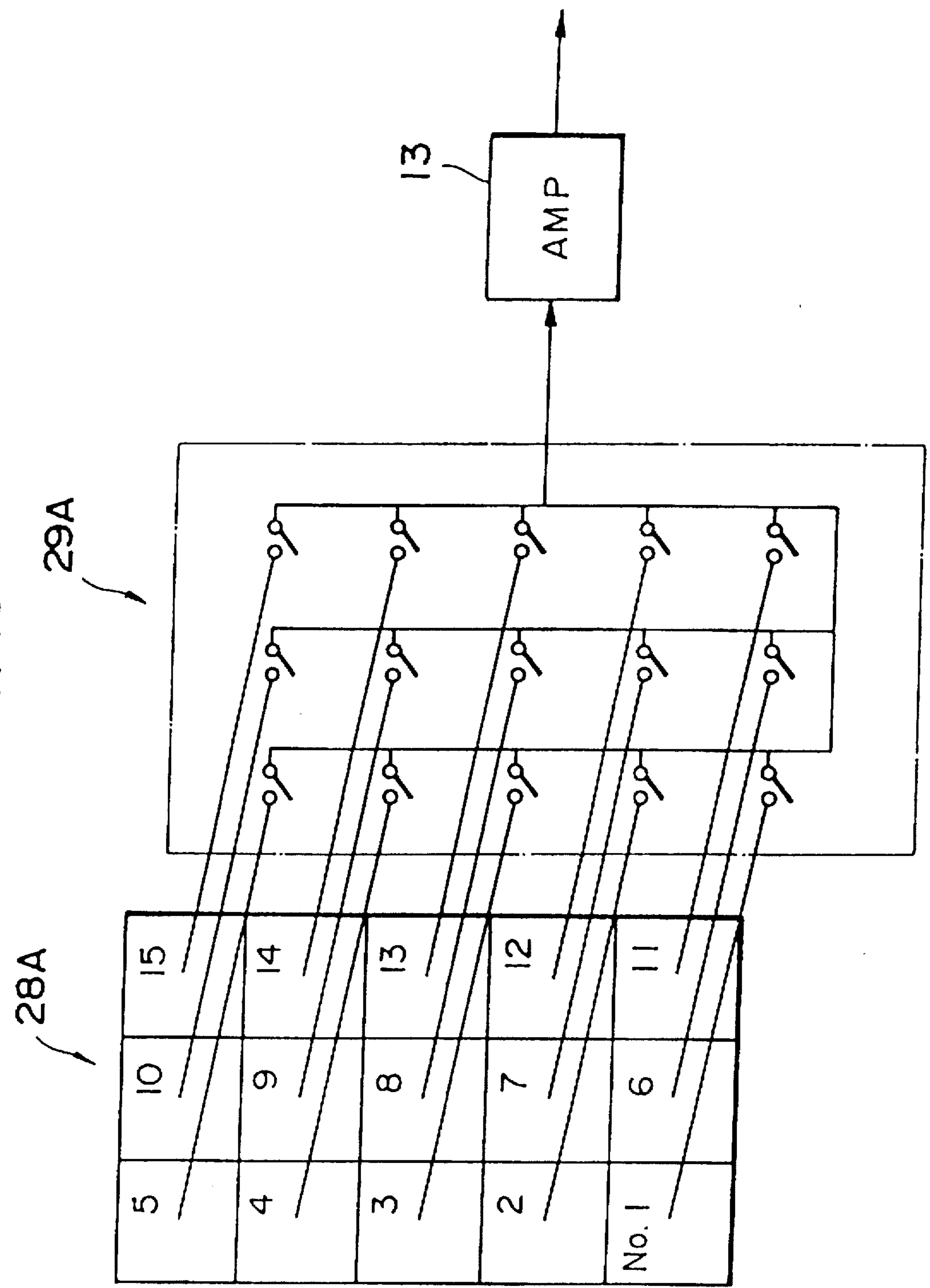
FIG. 13 is a circuit diagram illustrating an example of a configuration of the photodetectors and switches in the device when the beam is scanned in two dimensions.

The beam is reflected by the reflector on the preceding vehicle. The reflected beam enters lens 27, is condensed, and strikes photodetector device 28A. Device 28A, as can be seen in FIG. 13, includes a number of PDs (for example, fifteen PDs in three rows of five) arranged side by side in both the horizontal and vertical directions. Each PD has, for example, a square surface. The photodetector elements need not be arranged in a matrix or have a shape as described above, but could as well be arranged in a spiral or some other shape.

The output signal from each PD in photodetector device 28A is transmitted to amplifier 13 by way of selective switch 29A, which is controlled by CPU 10A as will be discussed hereafter. The output signal is amplified and a signal at a given threshold level is discriminated to yield an input to timing circuit 14 as a stop timing signal. Selective switch 29A selectively outputs the signal from one or more PDs, so it must include a number of semiconductor switching elements equal to the number of PDs connected in the several rows and columns.

Figure 14:
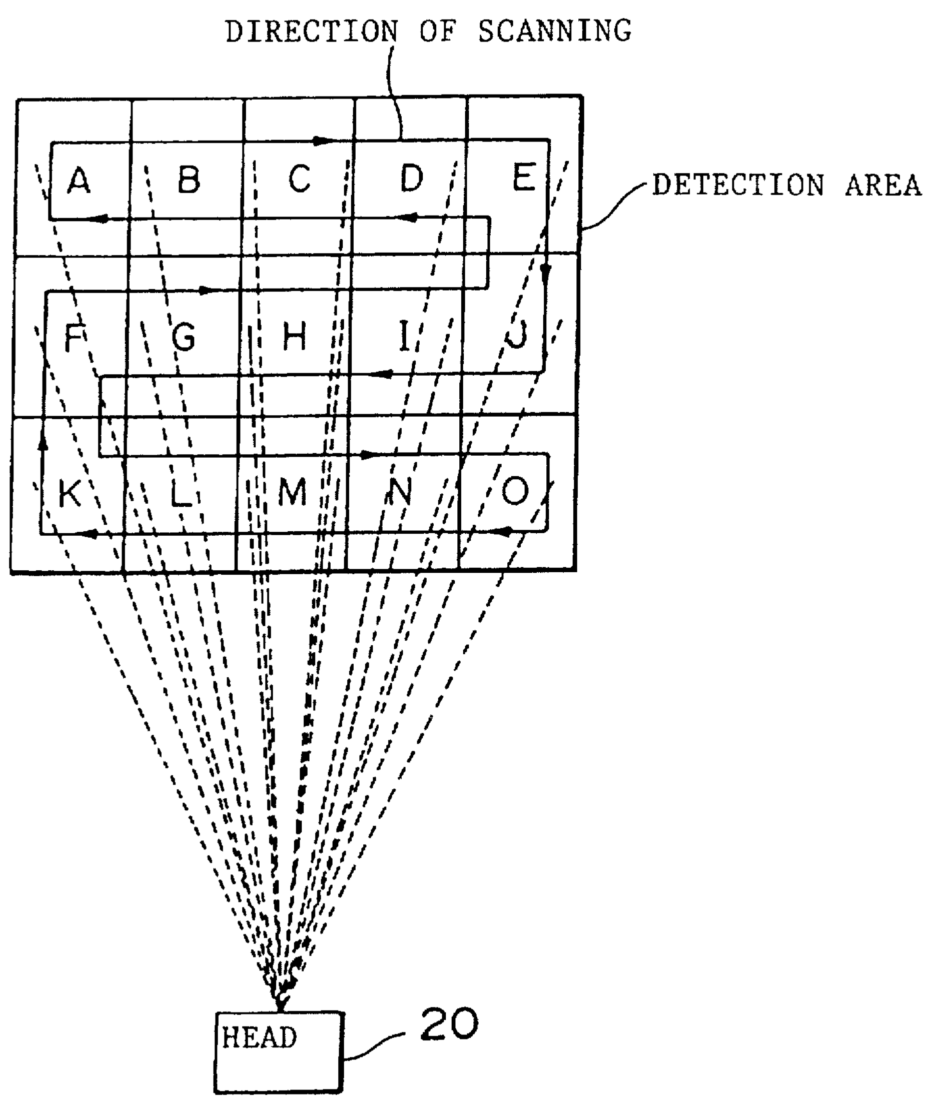
FIG. 14 shows an example of how the detection area is divided into small regions in two dimensions.
Figure 15:
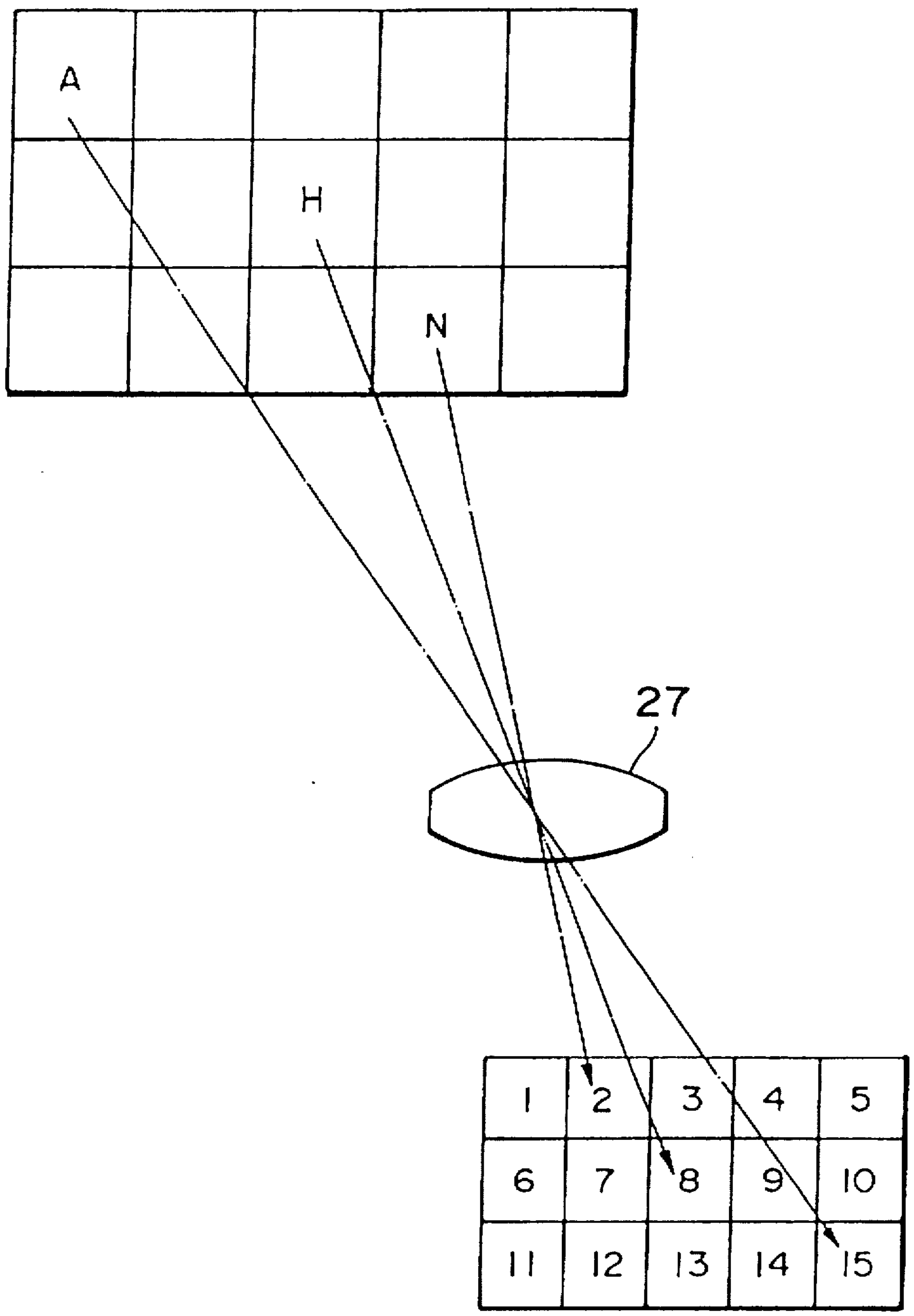
FIG. 15 shows a relationship between the optical system and the photodiodes.

As is shown in the example of FIG. 14, the angular range over which the beam is scanned (i.e., the detection area) is divided into regions A through O. The number of these regions is equal to the number of PDs (here, fifteen) in photodetector device 28A, and each region corresponds to one of the PDs. The beam may, for example, be scanned horizontally from one end of the detection area to the other, and then scanned vertically down one row (or up if the scan began with the bottom row) and back to the other end, thereby traversing regions A, B, C, D, E, J, I, and so on in that order. The reflection of the beam which strikes each region passes through the receptive optical system which includes lens 27, as shown in FIG. 15, and by the principles of geometrical optics, should strike a single PD. In principle, then, depending on the horizontal or vertical angle at which a beam is scanned, the output signal of a single PD should be transmitted to amplifier 13, and one of the semiconductor switching elements in switch 29A should go on. The reflection of a beam sent to region A, for example, should strike only PD 15.

If we assume that the maximum distance which can be measured is 100 meters, then the object (i.e., the other vehicle) is somewhere in the range between zero and one hundred meters away. Lens 27 has some degree of aberration. When we consider these facts, it becomes clear that the reflected beam cannot be condensed so as to strike one and only one of the PDs. For this reason, selective switch 29A in this embodiment is controlled so as to select the output signal from the PD which is optically determined by the horizontal and vertical angles of the projected beam and to select output signals from the PDs next to the optically determined PD, and/or those above and below the optically determined PD. How many PD signals to select should be determined after considering the properties of the optical system.

Figure 16:
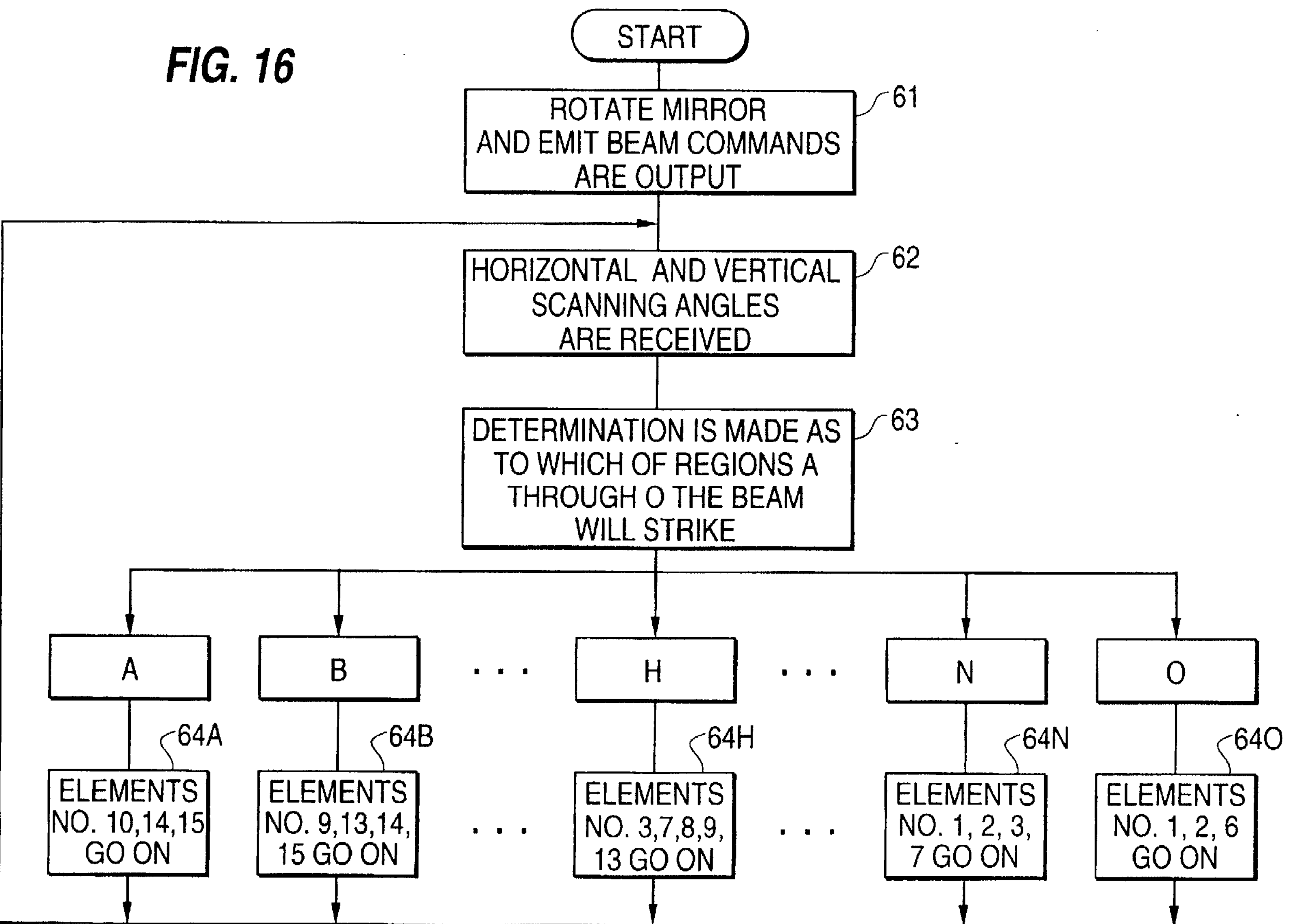
FIG. 16 is a flowchart of an order of processing executed to control the switches of FIG. 13.

FIG. 16 shows an order of processing performed by CPU 10A to control switch 29A. For convenience, the PDs and the semiconductor switching elements connected to them have been assigned numbers 1 through 15 (See FIGS. 13 and 15).

First, a rotate mirror command is transmitted to rotation device 24A and an emit command to pulse generator circuit 11, and the scanning of the beam is begun (Step 61).

Signals representing the horizontal and vertical scanning angles are picked up (Step 62), and, based on these signals, a determination is made as to which of regions A through O the beam will strike (Step 63). The semiconductor switching elements which correspond to this region go on (Steps 64A through 64O). If, for example, the beam is to strike region A in the corner of the detection area, then switching elements 10, 14 and 15 will go on (Step 64A). The signals from these three elements are added and input to amplifier 13. If the beam is to strike region H in the center of the detection area, switching elements 3, 7, 8, 9 and 13 go on (Step 64H). If the beam's target is region N on the side of the detection area, elements 1, 2, 3 and 7 go on (Step 64N). The operations shown in FIG. 16 should be synchronized with the timing signal for light emission which is input into CPU 10.

In this way the PD which corresponds to the path of the beam is selected. Based on the signal from this PD, (and the adjacent PDs, as described above) the distance can be calculated. Although stray light (including light emitted or reflected by vehicles in neighboring lanes) may strike the PDs which are not selected, the distance measurement operation will not be affected by this light.

Figure 17:
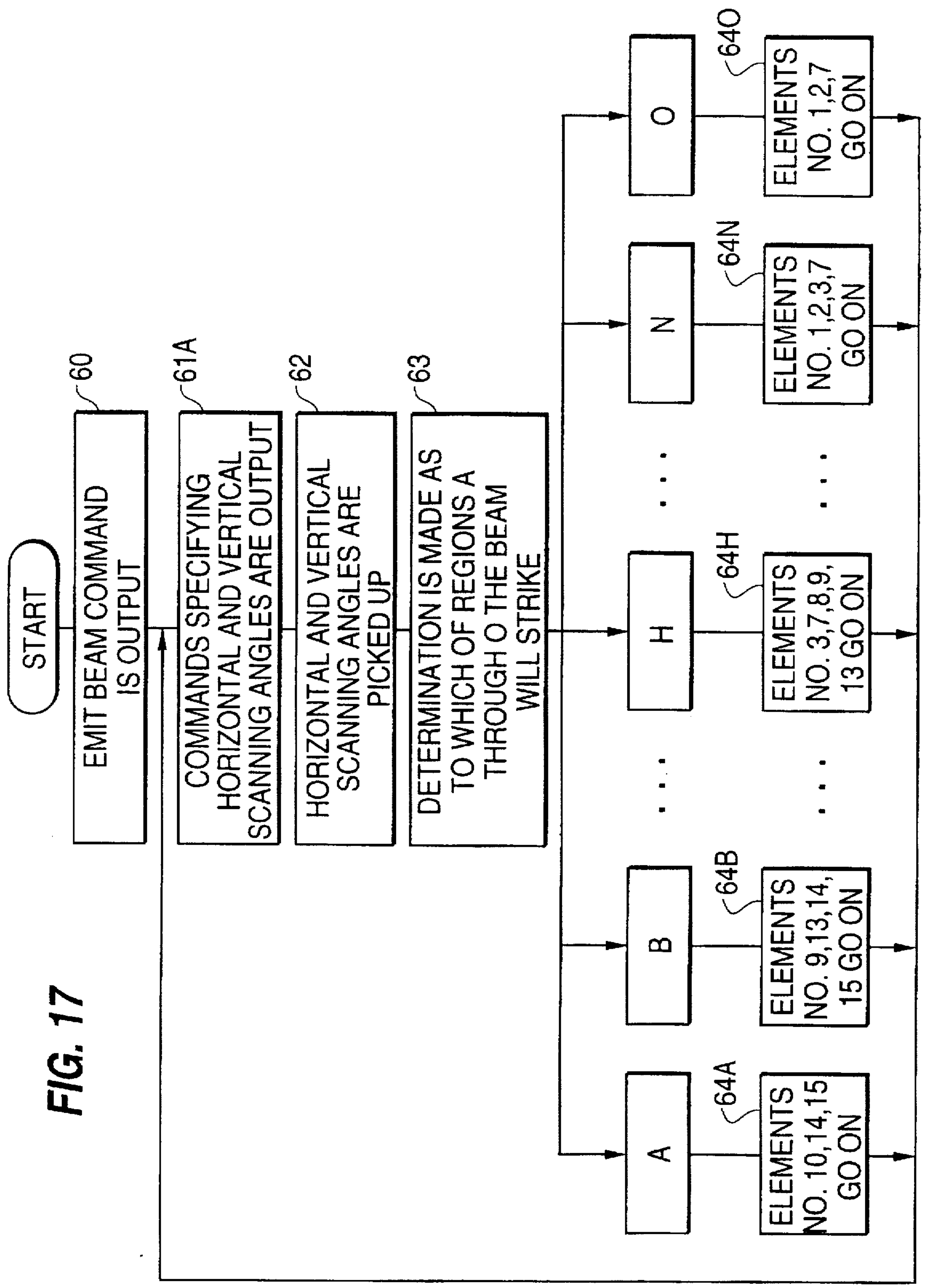
FIG. 17 is a flowchart of the order of processing executed to control the switches of FIG. 13 when the beam is scanned in a specified direction.

FIG. 17 shows an order of processing executed to control switch 29A when the beam is projected along a path (determined by horizontal and vertical scanning angles) specified by CPU 10A. Operations in FIG. 17 which are identical to operations in FIG. 16 are given the same numbers, and an explanation of them is therefore omitted.

First, CPU 10A transmits an emit command to pulse generator circuit 11, and projection device 21 projects a beam of light (Step 60).

CPU 10A transmits a command specifying the horizontal and vertical scanning angles (a rotate mirror command) to rotation device 24A (Step 61A). The horizontal and vertical scanning angles may be specified as a certain number of degrees, or they may be specified randomly or chaotically.

In response to a timing signal from pulse generator circuit 11, signals representing the horizontal and vertical scanning angles are picked up (Step 62). Based on these scanning angles, it is determined which of regions A through O the beam will strike (Step 63). The semiconductor switching elements corresponding to that region go on (Steps 64A to 64O). Another command representing scanning angles is output.

Figure 18:
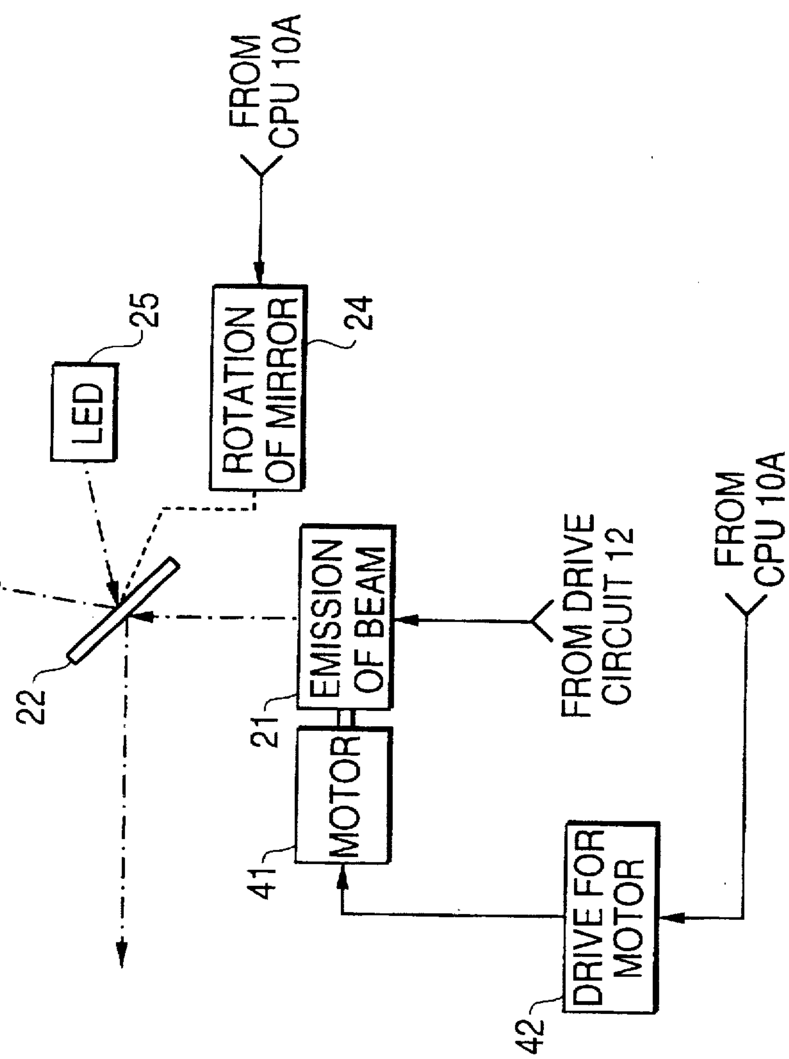
FIG. 18 shows a configuration of the projection unit in a head which scans a beam in two dimensions by another method.

FIG. 18 shows the configuration of the projection unit in a head 20 which scans a beam in two dimensions by another method. In this configuration, CPU 10A transmits a rotate mirror command to rotation device 24, and it transmits a command specifying the vertical scanning angle to circuit 42, the circuit which drives the motor used for vertical scanning. In response to the rotate mirror command, rotation device 24 rotates mirror 22 horizontally. Motor 41, which is used for vertical scanning, is driven by circuit 42. When circuit 42 drives motor 41 in response to a command from CPU 10A specifying the vertical scanning angle, projection device 21 is rotated vertically.

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A scanning-type distance measurement device to measure distance to an object, comprising:

a scanning light emitter to scan a beam of pulse light linearly;

a scanning position sensing device to detect a scanning position of said beam of pulse light and to output a position signal corresponding to the detected scanning position;

a photodetector device having a plurality of photodetector elements to receive portions of said beam of pulse light which are reflected from said object, said photodetector elements each outputting a beam signal;

a selective switch to select at least one of said photodetector elements and to output the beam signal corresponding to the selected at least one photodetector element; and a control device to receive the position signal from said scanning position sensing device and the beam signal from said selective switch and to calculate a distance between said scanning-type distance measurement device and said object.

2. A scanning-type distance measurement device to measure distance to an object according to claim 1, wherein said scanning light emitter scans said beam of pulse light over a previously determined angular range.

3. A scanning-type distance measurement device to measure distance to an object according to claim 2, wherein said scanning light emitter scans said beam of pulse light by rotating a mirror.

4. A scanning-type distance measurement device to measure distance to an object according to claim 1, wherein said plurality of photodetector elements are placed in a linear relationship.

5. A scanning-type distance measurement device to measure distance to an object according to claim 1, wherein said selective switch is synchronized with said scanning light emitter by said position signal.

6. A scanning-type distance measurement device to measure distance to an object according to claim 1, wherein said selective switch outputs beam signals from two or more of said plurality of photodetector elements which receive said portions of said beam of pulse light reflected from said object.

7. A scanning-type distance measurement device to measure distance to an object according to claim 1, wherein said scanning light emitter and said photodetector device are affixed to at least one of a front and a rear of an automobile.

8. A scanning-type optical device to detect a scanning beam, reflected from an object, comprising:

a scanning light emitter to scan a beam linearly;

a scanning position sensing device to detect a scanning position of said beam and output a position signal;

a photodetector device having a plurality of photodetector elements to receive said beam reflected from said object;

a selective switch to select a beam signal from one of said photodetector elements and output said beam signal selectively; and a control device to receive said position signal from said scanning position sensing device and said beam signal from said selective switch for processing.

9. A scanning-type optical device to detect a scanning beam reflected from an object according to claim 8, wherein said scanning light emitter scans said beam over a previously determined angular range.

10. A scanning-type optical device to detect a scanning beam reflected from an object according to claim 8, wherein said scanning light emitter scans said beam by rotating a mirror.

11. A scanning-type optical device to detect a scanning beam reflected from an object according to claim 8, wherein said plurality of photodetector elements are placed in a linear relationship.

12. A scanning-type optical device to detect a scanning beam reflected from an object according to claim 8, wherein said selective switch is synchronized with said scanning light emitter by said position signal.

13. A scanning-type optical device to detect a scanning beam reflected from an object according to claim 8, wherein said selective switch outputs beam signals from two or more of said plurality of photodetector elements which receive said beam reflected from said object.

14. A scanning-type optical device to detect a scanning beam reflected from an object according to claim 8, wherein said scanning light emitter and said photodetector device are affixed to at least one of a front and a rear of an automobile.

15. A scanning-type distance measurement device to measure distance to an object, comprising:

a scanning light emitter to scan a beam of pulse light in two-dimensions;

a scanning position sensing device to detect a scanning position of said beam of pulse light and to output a position signal;

a scanning angular sensing device to detect a scanning angle of said beam of pulse light and to output an angular signal;

a photodetector device having a plurality of photodetector elements to receive portions of said beam of pulse light reflected from the object and to output respective corresponding beam signals;

a selective switch to select at least one of said photodetector elements and to output said corresponding beam signals selectively; and a control device to receive said position signal from said scanning position sensing device, said angular signal from said scanning angular sensing device, and said corresponding beam signals from said selective switch and to calculate a distance between said scanning-type distance measurement device and said object.

16. A scanning-type distance measurement device to measure distance to an object according to claim 15, wherein said scanning-type distance measurement device scans said beam of pulse light by rotating a mirror horizontally and rotating said scanning light emitter vertically.

17. A scanning-type distance measurement device to measure distance to an object according to claim 15, wherein said plurality of photodetector elements are placed in two-dimensions.

18. A scanning-type distance measurement device to measure distance to an object according to claim 15, wherein said selective switch is synchronized with said scanning light emitter by said position signal and said angular signal.

19. A scanning-type distance measurement device to measure distance to an object according to claim 15, wherein said selective switch outputs said corresponding beam signals from two or more of said plurality of photodetector elements which receive said portions of said beam of pulse light reflected from said object.

20. A scanning-type distance measurement device to measure distance to an object according to claim 15, wherein said scanning light emitter and said photodetector device are affixed to at least one of a front and a rear of an automobile.

21. A scanning-type optical device to detect a scanning beam, reflected from an object, comprising:

a scanning light emitter to scan a beam in two-dimensions;

a scanning position sensing device to detect a scanning position of said beam and output a position signal;

a scanning angular sensing device to detect a scanning angle of said beam and output an angular signal;

a photodetector device having a plurality of photodetector elements to receive said beam reflected from said object;

a selective switch to select a beam signal from one of said photodetector elements and output said beam signal selectively; and a control device to receive said position signal, said angular signal and said beam signal from said selective switch for processing.

22. A scanning-type optical device to detect a scanning beam reflected from an object according to claim 21, wherein said scanning-type optical device scans said beam by rotating a mirror horizontally and rotating said scanning light emitter vertically.

23. A scanning-type optical device to detect a scanning beam reflected from an object according to claim 21, wherein said plurality of photodetector elements are placed in two-dimensions.

24. A scanning-type optical device to detect a scanning beam reflected from an object according to claim 21, wherein said selective switch is synchronized with said scanning light emitter by said position signal and said angular signal.

25. A scanning-type optical device to detect a scanning beam reflected from an object according to claim 21, wherein said selective switch outputs said beam signals from two or more of said plurality of photodetector elements which receive said beam reflected from said object.

26. A scanning-type optical device to detect a scanning beam reflected from an object according to claim 21, wherein said scanning light emitter and said photodetector device are affixed to at least one of a front and a rear of an automobile.

27. A method of determining a distance between objects, the method comprising the steps of:

transmitting, from a first object, a sequence of light pulses targeted at a second object to be reflected from said second object to different positions on said first object;

activating detectors at said different positions on said first object in a sequence determined by said sequence of light pulses transmitted; and measuring an amount of time between transmitting said sequence of light pulses and detection of a reflection thereof by the activated detectors, as indicative of said distance between said first and second objects.

28. The method recited in claim 27 further comprising, at said first object, aiming a light beam at a mirror and changing a position of said mirror to generate said sequence of light pulses.

29. The method recited in claim 28 wherein one of said detectors is activated to detect reflection from said second object in correspondence with said changing the position of said mirror.

* * * * *